April 9, 1957  G. T. SCHJELDAHL  2,788,039
THERMOPLASTIC BAG
Filed July 28, 1954
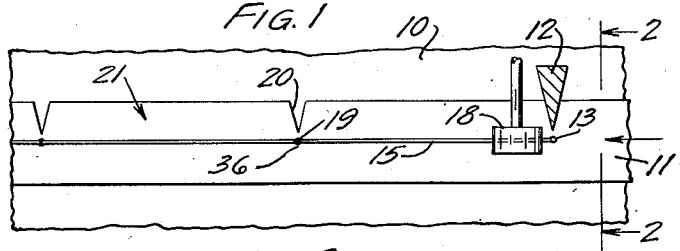
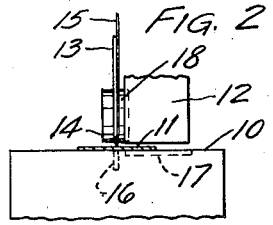
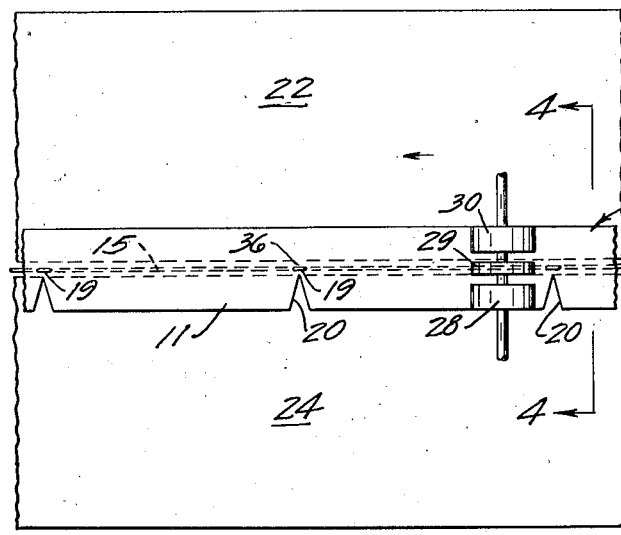
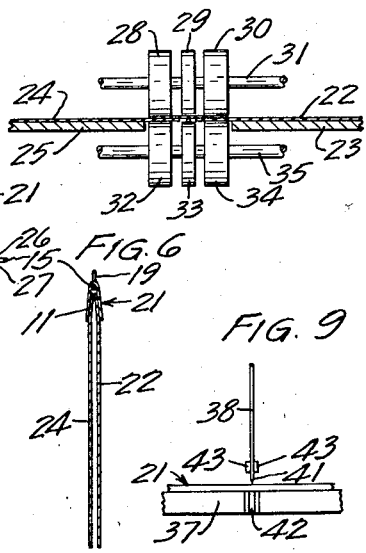
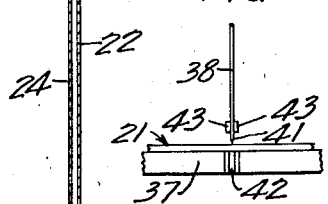
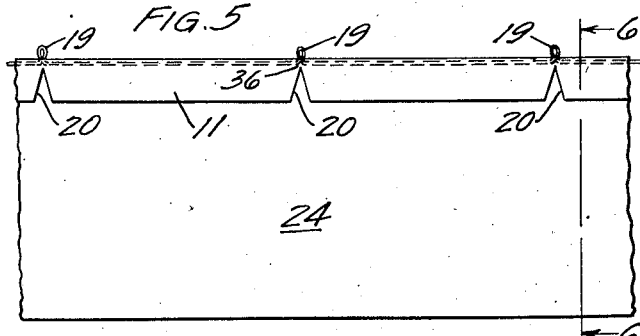
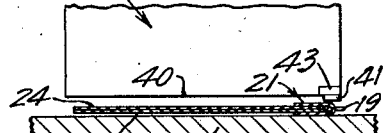
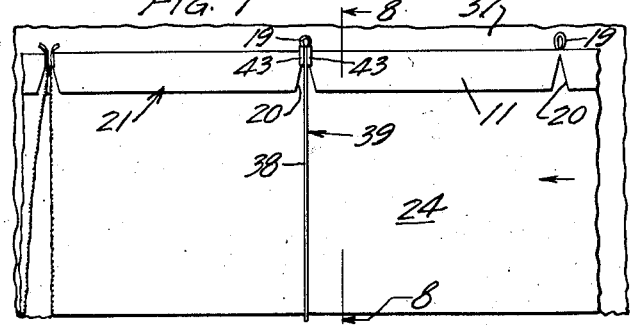
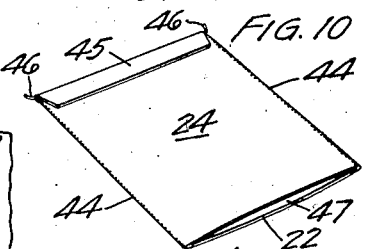
INVENTOR
GILMORE T. SCHJELDAHL
BY Howard Fischer
ATTORNEY

United States Patent Office 2,788,039
Patented Apr. 9, 1957

2,788,039

THERMOPLASTIC BAG

Gilmore T. Schjeldahl, Farmington, Minn., assignor to Brown & Bigelow, St. Paul, Minn., a corporation of Minnesota Application July 28, 1954, Serial No. 446,376

4 Claims. (Cl. 150—.5)

In the art of manufacturing thermoplastic bags by side welding and cutting continuous strips of thermoplastic material, the bag is usually constructed with an open top so that the user may fill the bag and form or attach the final top closure thereto subsequent to filling.

In other instances, thermoplastic bags are made in which an end closure is constructed of label stock, or of a simple thermoplastic seal, prior to the filling of the bag, the bottom of the bag being left in open condition. Such bag is then filled from the bottom and a simple thermoplastic seal formed thereacross to complete the packaged article. The end which has been closed prior to filling then becomes the top when the filled package is inverted. Open bottomed bags with pre-attached tops have many desirous qualities but, in the main, are quite expensive to produce since there is no quick and easy method prior to my invention which will render the manufacture thereof a continuous process beginning with rolled stock material, both for the sides of the bag and for the header or top closure.

The problem becomes especially acute where it is attempted to deviate from use of the same thermoplastic material in the case of the header as is employed in the body of the bag. Thus, where paper label stock is attempted to be applied in a continuous strip with the bag formed in a side weld, the problem of sealing and severing the paper interferes with the otherwise simple job of cutting and side welding the bag in a continuous manner. Thermoplastic material such as polyethylene will lend itself readily to the simultaneous cutting and welding at a predescribed temperature. Where the hot knife which performs the cutting and welding must also sever such material as paper, it can be easily understood why the complete welding and cutting cannot be made across the entire bag. Even though the paper be coated with thermoplastic material, the paper itself does not have a thermoplastic quality and hence would have to be burned through if the hot knife method were used or else be cut by physical shearing action. The extra heat for burning would be too high for proper welding of the adjacent thermoplastic material. On the other hand, physical cutting leaves no concurrent edges of thermoplastic sheeting available for welding in a simple manner. It is, of course, possible to adhesively secure the sides of a continuously cut top closure but the advantages of the continuous operation would be lost by the additional complicated step. It has therefore been the practice when constructing a side welded thermoplastic bag having a paper top or closure, to apply the closure individually after the bag has been formed at the sides.

My invention contemplates a bag of simple construction resulting from the joining of continuous label or header stock with continuous sheets of thermoplastic material, the juncture and complete construction being simply performed in one operation.

It is an important object of the invention to provide a special label stock which can be continuously attached to thermoplastic sheeting with welding and severing of the bag accomplished in a single step in the process.

It is another object of the invention to provide a thermoplastic bag having a pre-attached header or top closure formed of label stock, the side edges being recessed preliminarily to permit the thermoplastic sheets forming the sides of the bag to be welded substantially for the entire height of the bag.

It is another object of the invention to provide an easily operable thermoplastic bag having an open bottom and pre-attached paper closure in which the bag can be formed in a simple operation which accomplishes side welding and cutting of a continuous strip of paper label stock.

These and other objects and advantages of the invention will more fully appear from the following description made in connection with the accompanying drawings, wherein like reference characters refer to the same or similar parts throughout the several views, and in which:

Fig. 1 is a diagrammatic representation of the notching and thread-looping mechanism while operating upon a strip of thermoplastic coated paper to prepare it for attachment to the thermoplastic side sheets. The view is a top view with the cutting or punching elements shown in horizontal section and the thread placing mechanism shown in fragment;

Fig. 2 is an end view of the diagrammatic mechanism broken away from unessential parts and showing the paper strip in position for punching, the view being taken on the line 2—2 and in the direction of the arrows of Fig. 1;

Fig. 3 is a top view of the prepared header or closure strip being thermoplastically sealed in a continuous manner to contiguous edges of a pair of thermoplastic sheets. Unessential portions of the heating rolls are cut away from the view;

Fig. 4 is an end view of the heat sealing mechanism and the material being sealed, the view being taken in vertical section on the line 4—4 of Fig. 3;

Fig. 5 shows the folding operation in which the separate sides of continuous thermoplastic sheets are brought together with the header strip folded longitudinally and the tear string looped in alignment with the predetermined weld line and cut line, unessential parts being cut away;

Fig. 6 is a vertical section of the folded header and sheets taken on the line 6—6 of Fig. 5;

Fig. 7 is a top view of a fragmentary portion of the product produced by the previous steps defined in Figs. 1 through 5 with the cutting and sealing element diagrammatically indicated in position for the separating and welding of two contiguous side edges of bags produced from the thermoplastic material;

Fig. 8 is a fragmentary view of the material and the cutting and sealing element, the thermoplastic sides and header being shown in vertical section on line 8—8 of Fig. 7;

Fig. 9 is a fragmentary and enlarged view of the cutting and sealing element taken from the right as viewed in Fig. 8; and Fig. 10 is a perspective view of the finished product bearing an open end ready for filling.

Referring to the drawing, and more particularly to Fig. 1, the construction of the header or closure strip is there illustrated. A supporting surface 10 is adapted to have fed longitudinally therealong a continuous strip 11 of paper label stock treated with a thermoplastic coating at least on one side thereof. The particular thermoplastic coating used is not important to the disclosure of this invention. It is important only that the coating be capable of sealing or adhering to the thermoplastic sheet material constituting the side walls of the finished bag and having a melting temperature somewhat below that of the thermoplastic sheet material. Cutting or punching element 12 is positioned in opposed relation with surface 10 and a needle for feeding a string in periodic punched loops may be disposed adjacent the cutter or punching element 12 as shown at 13. The needle 13 may be similar to an ordinary sewing needle having an eye 14 or equivalent thread engaging portion adapted to force the string 15 downwardly through the closure strip 11 at the same intervals as the cutting or notching element 12 performs its function. The needle 13 may pass through the strip 11 and into a socket 16 formed in supporting surface 10. A similar recessed portion constituting a matching die for the cutter or puncher 12 is indicated at 17 as shown in Fig. 2. The strip 11 travels in the direction of the arrow shown in Fig. 1 and thread 15 is fed from a source (not shown) through needle 13 at the thread engaging portion 14 and then may be secured to the thermoplastic coating on strip 11 by such means as the heated wheel 18 as shown in Figs. 1 and 2. Mechanism (not shown) is provided for periodically reciprocating the cutting or punching element 12 through the strip 11 as it moves in the direction of the arrow in Fig. 1. The string 15 will lie continuously along strip 11 and be punched in a loop at 19 through a medial portion of the strip 11 and in alignment with each of the notches 20 as shown. The prepared closure or header strip is indicated generally at 21 and may be rolled into convenient sizes from which the stock may be unwound when it is applied continuously in the manufacture of the side welded bags.

In producing the bags from continuous sheets of thermoplastic material, the sheets are first positioned as shown in Fig. 3, sheet 22 being fed continuously along a platform or surface 23 as shown in Fig. 4 and a second thermoplastic sheet 24 preferably constructed of the same thermoplastic material is fed at the same rate along the platform or surface 25. The opposed and adjacent edges are indicated at 26 and 27 respectively. Also fed at the same longitudinal rate is a continuous strip 21 as prepared under the foregoing method and having the spaced notches 20 and loops 19 formed therein. The prepared closure strip 21 is caused to overlie the contiguous edges 26 and 27 of the traveling sheets 22 and 24, the center line of the strip 21 preferably coinciding with the close gap established between the contiguous side edges 26 and 27 of thermoplastic sheets 22 and 24 respectively. The header strip 21 is coated with a thermoplastic substance at least on the under side as viewed in Fig. 3.

As the three parts 21, 22 and 24 travel together, a continuously operating heat sealer is provided in the upper rotary element 28, 29 and 30 as shown in Figs. 3 and 4. The heated rollers may be mounted for rotation on a common axle 31, a fragment of which is shown in Figs. 3 and 4. A corresponding lower set of heated rollers may be supplied at 32, 33 and 34 as shown in Fig. 4. These rollers may likewise be mounted on a common axis 35, a fragment of which is shown in Fig. 4. The table or supporting surfaces 23 and 25 may lie in spaced relation so as to permit the rollers 32, 33 and 34 to operate therebetween and in pressing engagement with the rollers 28, 29 and 30. As is obvious to those skilled in the art, both of the sets of upper and lower rollers may be heated or only one of the sets need be heated in order to accomplish the sealing of the prepared header strip 21 to the thermoplastic sheets 22 and 24. It will be observed that the loop 19 extends upwardly from the surface of strip 21 in the sealed position shown in Fig. 3.

The next step in the continuous production of side welded bags by my method requires the sheets 22 and 24 to be folded in overlapping relation, the fold line coinciding with the thread line 15 and lying in aligned close clearance with notches 20 as shown in Fig. 5. When the cutting or notching element 12 and the threading needle 13 formed the header strip 21, a web or connecting area 36 was left between each notch 20 and the opposite edge of the strip 21. This web maintained the strip in continuous length despite its weakness. Now, when the thermoplastic sheets 22 and 24 are folded in overlapping relation as shown in Fig. 5, the web 36 still exists in the strip 21 at the underside of the notched area 20.

The folded product of Fig. 5 appears in edge view in the vertical section shown in Fig. 6. This folded product is now ready to be separated and sealed in accordance with the last step in my process. The continuous folded product is fed along a table or supporting surface 37 in the direction of the arrow in Fig. 7. A reciprocable hot knife 38 forms a part of the cutting and sealing element 39 and is adapted to engage the folded sheets transversely in the manner shown in Figs. 7 and 8. The hot knife 38 terminates in a cutting and welding edge 40 and extends for a distance equal to the height of the bag (or width of the folded strip), including the width of the folded web 36 as shown in Fig. 7. It is not essential that the weld be consumated completely to the uppermost terminus of the notched portion 20, but it is preferred that it substantially do so. The cutting and sealing element 39 has a small shearing device 41 which is secured as an extension in alignment with the hot knife edge 40 and preferably offset downwardly therefrom for a short distance as shown in Figs. 8 and 9. The knife 41 is intended to physically shear the top of web 36 and the thread loop 19. The knife 41 is adapted to cooperate with the supporting surface or table 37 and may do so through such means as a shearing engagement with a slotted portion 42, as shown in Fig. 9.

Also forming a part of the cutting and sealing element 39 is a heated sealing member 43 as shown in Figs. 7, 8 and 9. Sealing member 43 extends to both sides of the shearing knife 41 and is adapted to press on the web area 36 immediately after the knife 41 has severed the folded material at the web area. The heating element 43 will then effect a pressure seal for that distance not fully welded and cut by the hot knife edge 40. It will be noted that in a single and downward movement of the cutting and sealing element 39, the sheets 24 and 22 are completely severed and at the same time heat welded along the side edges 44 as shown in Fig. 10. The underlying paper strip web 36 may retain the bags together until use and then can be simply cut or torn to free each completed bag. The paper closure or header in its completed condition is indicated at 45 and the tear string when cut at the loop will leave a projecting end 46 which can be grasped to cut or tear the header 45 at the medial fold line after the bag has been filled with a product and the open bottom 47 has been sealed. Since there is not a seal between the contiguous edges 26 and 27, of the side sheets 22 and 24, the top will be completely opened as soon as the tear strip 36 is caused to rupture the fold line of header 45.

It may thus be seen that I have devised a side welded thermoplastic bag with a paper header, and a method for the construction thereof which permits continuous lengths of header stripping and of thermoplastic sheeting to be formed in a manner which will admit of complete preparation of one side of a bag in a single operation of the cutting and sealing element. The bag formed thereby is strong in structure and is sealed substantially continuously around the corners and edges, yet when purchased with the product contained therein may be readily opened by the simplest of manipulations.

It will, of course, be understood that various changes may be made in the form, details, arrangement and proportions of the parts without departing from the scope of the invention.

What I claim is:

1. A side-welded bag which comprises a front and a back sheet of thermoplastic material such as polyethylene, the side edges of which are welded by heat fusion to form a strong seal therealong, said bag having an open bottom formed by substantially concurrent edges of said front and back sheets and adapted to receive material therethrough and subsequently to be sealed together in a bottom seam, a top closure of label stock having on at least one side thereof a thermoplastic coating, said label stock being folded longitudinally along the end of the open bag top and heat sealed to the bag top between said coating and the thermoplastic front and back at respective upper surfaces therof, said closure being of substantially the same width as the top of the bag from welded side to welded side.

2. A side-welded bag which comprises a front and a back sheet of thermoplastic material such as polyethylene, the side edges of which are welded by heat fusion to form a strong seal therealong, said bag having an open bottom formed by substantially concurrent edges of said front and back sheets and being adapted to receive material therethrough in filling relation prior to sealing thereof in a bottom seam, thermoplastic coated paper folded longitudinally over the open bag top and secured to the bag top through a heat seal between said coated paper and the front and back sheet at respective transverse upper surfaces thereof to close the top of said bag, and a tear string overlying the bag top and underlying the paper closure at the longitudinal fold thereof, said closure being of substantially the same width as the top of the bag from welded side to welded side and the side edges of the folded thermoplastic paper being recessed inwardly and downwardly on one side from the top corners of the paper closure.

3. A side-welded bag which comprises a front and a back sheet of thermoplastic material such as polyethylene, the side edges of which are welded by heat fusion to form a strong seal therealong, said bag having an open bottom formed by substantially concurrent edges of said front and back sheets and adapted to receive material in filling relation therethrough prior to sealing thereof in a bottom seam, and a top closure of thermoplastic coated label stock, said label stock being folded longitudinally over the end of the open bag top and heat sealed to the bag top to close the same between said coated label stock and the thermoplastic front and back at the respective upper outside surfaces thereof, said label stock being of the same width as the side welded bag at the extreme upper edges and recessed therebelow from the side welded edges, said closure further being sealed in heat pressed relation together with the front and back thermoplastic sheets at each side of the bag and at the positions where the label stock is of the same width as the bag.

4. A side-welded bag which comprises a front and a back sheet of thermoplastic material such as polyethylene, the side edges of which are welded by heat fusion to form a strong seal therealong, said bag having an open bottom formed by substantially concurrent edges of said front and back sheets and adapted to receive material in filling relation therethrough prior to sealing together in a bottom seam, and a top closure member of label stock having on at least one side thereof a thermoplastic coating, said label stock being folded longitudinally over the end of the open bag top and being heat sealed in a continuous line at its inner surface to the upper outer surfaces of each of said front and back sheets, said closure being of substantially the same width as the top of the bag from welded side to welded side.

References Cited in the file of this patent
UNITED STATES PATENTS

| | | |
|---|---|---|
| 529,690 | Arkell et al. | Nov. 27, 1894 |
| 749,425 | Collins | Jan. 12, 1904 |
| 1,702,592 | Carpenter et al. | Feb. 19, 1929 |
| 2,380,914 | Billeb | Aug. 7, 1945 |
| 2,496,753 | Salfisberg | Feb. 7, 1950 |